United States Patent
Bagci et al.

(10) Patent No.: US 11,010,902 B2
(45) Date of Patent: May 18, 2021

(54) CAPSULES FOR IMAGE ANALYSIS

(71) Applicant: University of Central Florida Research Foundation, Inc., Orlando, FL (US)

(72) Inventors: Ulas Bagci, Orlando, FL (US); Rodney LaLonde, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 36 days.

(21) Appl. No.: 16/431,387

(22) Filed: Jun. 4, 2019

(65) Prior Publication Data
US 2019/0370972 A1    Dec. 5, 2019

Related U.S. Application Data

(60) Provisional application No. 62/680,411, filed on Jun. 4, 2018.

(51) Int. Cl.
*G06K 9/34* (2006.01)
*G06T 7/11* (2017.01)
(Continued)

(52) U.S. Cl.
CPC .............. *G06T 7/11* (2017.01); *G06N 3/084* (2013.01); *G06N 20/10* (2019.01); *G06T 7/0012* (2013.01);
(Continued)

(58) Field of Classification Search
CPC .............. G06T 7/11; G06T 7/0012; G06T 2207/20081; G06T 2207/20084;
(Continued)

(56) References Cited

U.S. PATENT DOCUMENTS

2018/0285682 A1* 10/2018 Najibi ................. G06K 9/6289
2019/0205589 A1*  7/2019 Lo ....................... G06K 9/0008

OTHER PUBLICATIONS

Parnian Afshar, "Brain tumor type classification via capsule networks" Concordia Institute for Information Systems Engineering, Concordia University, Montreal, QC, Canada Department of Electrical and Computer Engineering, University of Toronto, Toronto, ON, Canada (Year: 2018).*

(Continued)

*Primary Examiner* — Dhaval V Patel
(74) *Attorney, Agent, or Firm* — Smith & Hopen, P.A.; Paul Murty

(57) ABSTRACT

An improved method of performing object segmentation and classification that reduces the memory required to perform these tasks, while increasing predictive accuracy. The improved method utilizes a capsule network with dynamic routing. Capsule networks allow for the preservation of information about the input by replacing max-pooling layers with convolutional strides and dynamic routing, allowing for the reconstruction of an input image from output capsule vectors. The present invention expands the use of capsule networks to the task of object segmentation and medical image-based cancer diagnosis for the first time in the literature; extends the idea of convolutional capsules with locally-connected routing and propose the concept of deconvolutional capsules; extends the masked reconstruction to reconstruct the positive input class; and proposes a capsule-based pooling operation for diagnosis. The convolutional-deconvolutional capsule network shows strong results for the tasks of object segmentation and classification with substantial decrease in parameter space.

19 Claims, 14 Drawing Sheets
(7 of 14 Drawing Sheet(s) Filed in Color)

(51) Int. Cl.
G06T 7/00 (2017.01)
G06N 20/10 (2019.01)
G06N 3/08 (2006.01)

(52) U.S. Cl.
CPC .............. G06T 2207/20081 (2013.01); G06T 2207/20084 (2013.01)

(58) Field of Classification Search
CPC ........... G06T 2207/10081; G06T 2207/30064; G06N 20/10; G06N 3/084; G06N 3/0454
See application file for complete search history.

(56) References Cited

OTHER PUBLICATIONS

Ronneberger et al., U-net: Convolutional networks for biomedical image segmentation. International Conference on Medical image computing and computer-assisted intervention. 2015: 234-241.
Mortazi et al., Multi-planar deep segmentation networks for cardiac substructures from mri and ct. Stat. 2017. vol. 1050: 1-8.
Jégou et al., The one hundred layers tiramisu: Fully convolutional densenets for semantic segmentation. IEEE Conference on Computer Vision and Pattern Recognition Workshops (CVPRW). 2017: 1175-1183.
Mortazi et al., Cardiacnet: Segmentation of left atrium and proximal pulmonary veins from mri using multi-view cnn. International Conference on Medical Image Computing and Computer-Assisted Intervention. 2017: 377-385.
Badrinarayanan et al., SegNet: A deep convolutional encoder-decoder architecture for image segmentation. IEEE transactions on pattern analysis and machine intelligence. 2017. vol. 39 (No. 12): 2481-2495.
Lin et al., RefineNet: Multi-path refinement networks for high-resolution semantic segmentation. IEEE Computer Society Conference on Computer Vision and Pattern Recognition (CVPR 2017). 2017: 1925-1934.
Zhao et al., Pyramid scene parsing network. IEEE Computer Society Conference on Computer Vision and Pattern Recognition. (CVPR 2017). 2017: 2881-2890.
Peng et al., Large kernel matters—improve semantic segmentation by global convolutional network. IEEE Computer Society Conference on Computer Vision and Pattern Recognition (CVPR 2017). 2017: 4353-4361.
LaLonde et al., Clusternet: Detecting small objects in large scenes by exploiting spatio-temporal information. IEEE Computer Society Conference on Computer Vision and Pattern Recognition (CVPR 2018). 2018: 4003-4012.
Chen et al., Deeplab: Semantic image segmentation with deep convolutional nets, atrous convolution, and fully connected crfs. IEEE transactions on pattern analysis and machine intelligence. 2018. vol. 40 (No. 4): 834-848.
Mansoor et al., A generic approach to pathological lung segmentation. IEEE Trans Med Imaging. 2014. vol. 33 (No. 12): 2293-2310.
Sabour et al., Dynamic routing between capsules. 31st Conference on Neural Information Processing Systems (NIPS 2017). 2017: 3859-3869.
Zhang et al., Automatic detection and classification of colorectal polyps by transferring low-level cnn features from nonmedical domain. IEEE Journal of Biomedical and Health Informatics. 2017. vol. 21 (No. 1): 41-47.
Byrne et al., Real-time differentiation of adenomatous and hyperplastic diminutive colorectal polyps during analysis of unaltered videos of standard colonoscopy using a deep learning model. Gut. 2019. vol. 68: 94-100.
Chen et al., Accurate classification of diminutive colorectal polyps using computer-aided analysis. Gastroenterology. 2018. vol. 154: 568-575.
Buty et al., Characterization of lung nodule malignancy using hybrid shape and appearance features. In International Conference on Medical Image Computing and Computer-Assisted Intervention. 2016: 662-670.
Hussein et al., Tumornet: Lung nodule characterization using multi-view convolutional neural network with gaussian process. 2017 IEEE 14th International Symposium on Biomedical Imaging (ISBI 2017). 2017: 1007-1010.
Hussein et al., Risk stratification of lung nodules using 3d cnn-based multi-task learning. In International Conference on Information Processing in Medical Imaging. 2017: 249-260.
Khosravan and Bagci. S4nd: Single-shot single-scale lung nodule detection. Medical Image Computing and Computer Assisted Intervention (MICCAI). 2018: 794-802.
Khosravan et al., A collaborative computer aided diagnosis (c-cad) system with eye-tracking, sparse attentional model, and deep learning. Medical Image Analysis. 2019. vol. 51: 101-115.
Krizhevsky et al., Imagenet classification with deep convolutional neural networks. Advances in neural information processing systems. 2012: 1097-1105.
LaLonde and Bagci. Capsule for Object Segmentation. 1st Conference on Medical Imaging with Deep Learning (MIDL 2018) 2018: 1-9.

* cited by examiner

Algorithm 1 Locally-Constrained Dynamic Routing.

1: procedure ROUTING($a_{xy|ij}, d, \ell, k_h, k_w$)
2:      for all capsule types $t_i^\ell$ within a $k_h \times k_w$ kernel centered at position $(x, y)$ in layer $\ell$ and capsule $xy$ centered at position $(x, y)$ in layer $(\ell + 1)$: $b_{ij|xy} \leftarrow 0$.
3:      for $d$ iterations do
4:          for all capsule types $t_i^\ell$ in layer $\ell$: $c_{ij} \leftarrow \mathrm{softmax}(b_{ij})$    ▷ softmax computes Eq. 1
5:          for all capsules $xy$ in layer $(\ell + 1)$: $p_{xy} \leftarrow \sum_m c_{ij|xy} a_{xy|ij}$
6:          for all capsules $xy$ in layer $(\ell + 1)$: $v_{xy} \leftarrow \mathrm{squash}(p_{xy})$    ▷ squash computes Eq. 2
7:          for all capsule types $t_i^\ell$ in layer $\ell$ and capsules $xy$ in layer $(\ell + 1)$: $b_{ij|xy} \leftarrow b_{ij|xy} + a_{xy|ij} \cdot v_{xy}$
     return $v_{xy}$

Fig. 3

| Method | Parameters | Split-0 (%) | Split-1 (%) | Split-2 (%) | Split-3 (%) | Average |
|---|---|---|---|---|---|---|
| U-Net | 31.0 M | 98.353 | 98.432 | 98.476 | 98.510 | 98.449 |
| Tiramisu | 2.3 M | 98.394 | 98.358 | 98.543 | 98.339 | 98.410 |
| Baseline Caps | 1.7 M | 82.287 | 79.939 | 95.121 | 83.608 | 83.424 |
| SegCaps (R1) | 1.4 M | 98.471 | 98.444 | 98.401 | 98.362 | 98.419 |
| SegCaps | 1.4 M | 98.499 | 98.523 | 98.455 | 98.474 | 98.479 |

Table 1

Fig. 4

| Modality | D-Caps | | | Inceptionv3 Pretrained | | | Inceptionv3 Scratch | | |
|---|---|---|---|---|---|---|---|---|---|
| | Acc. % | Sen. % | Spec. % | Acc. % | Sen. % | Spec. % | Acc. % | Sen. % | Spec. % |
| All Images | 63.66 | 65.26 | 60.00 | 64.88 | 67.86 | 58.00 | 54.28 | 54.83 | 53.00 |
| All Polyps | 65.53 | 71.12 | 53.79 | 65.04 | 68.23 | 58.33 | 56.23 | 63.18 | 41.67 |
| NBI | 56.69 | 54.23 | 61.98 | 61.15 | 61.15 | 61.16 | 52.49 | 57.69 | 41.32 |
| NBI-F | 53.37 | 51.97 | 57.14 | 63.94 | 69.74 | 48.21 | 58.65 | 59.21 | 57.14 |
| NBI-N | 60.95 | 59.74 | 64.29 | 60.448 | 59.74 | 62.50 | 53.33 | 56.49 | 44.64 |
| WL | 68.81 | 74.06 | 57.38 | 64.69 | 68.42 | 56.56 | 55.41 | 54.89 | 56.56 |
| WL-F | 72.48 | 75.63 | 63.79 | 68.81 | 78.75 | 41.38 | 55.50 | 53.75 | 60.34 |
| WL-N | 67.65 | 70.86 | 58.49 | 68.14 | 71.52 | 58.49 | 58.33 | 58.94 | 56.60 |
| Near | 67.57 | 70.19 | 60.66 | 63.96 | 66.46 | 57.38 | 57.66 | 63.35 | 42.62 |
| Far | 69.64 | 73.62 | 59.02 | 65.18 | 76.69 | 34.43 | 58.48 | 63.19 | 45.90 |

Table 2

Fig. 8

| Modality | D-Caps | | | Inceptionv3 Pretrained | | | Inceptionv3 Scratch | | |
|---|---|---|---|---|---|---|---|---|---|
| | Acc. % | Sen. % | Spec. % | Acc. % | Sen. % | Spec. % | Acc. % | Sen. % | Spec. % |
| All Images | 59.81 | 61.39 | 56.00 | 64.00 | 64.52 | 62.75 | 51.21 | 53.49 | 45.75 |
| All Polyps | 60.95 | 63.19 | 56.06 | 64.52 | 65.97 | 61.36 | 48.10 | 50.35 | 43.18 |
| NBI | 60.36 | 60.00 | 61.16 | 58.82 | 54.81 | 67.77 | 45.27 | 41.11 | 54.55 |
| NBI-F | 60.09 | 59.24 | 62.50 | 64.32 | 64.33 | 64.29 | 51.17 | 50.96 | 51.79 |
| NBI-N | 63.59 | 65.22 | 58.93 | 58.99 | 54.04 | 73.21 | 46.54 | 46.58 | 46.43 |
| WL | 54.39 | 59.21 | 43.44 | 66.67 | 70.76 | 57.38 | 51.88 | 56.68 | 40.98 |
| WL-F | 55.86 | 64.02 | 32.76 | 68.02 | 76.22 | 44.83 | 59.01 | 66.46 | 37.93 |
| WL-N | 56.67 | 58.60 | 50.94 | 62.38 | 63.06 | 60.38 | 50.95 | 58.60 | 28.30 |
| Near | 58.52 | 60.12 | 54.10 | 62.88 | 61.90 | 65.57 | 47.60 | 51.79 | 36.07 |
| Far | 62.01 | 67.86 | 45.90 | 68.56 | 74.40 | 52.46 | 50.22 | 55.36 | 36.07 |

Table 3

Fig. 9

| Modality | D-Caps | | | Inceptionv3 Pretrained | | | Inceptionv3 Scratch | | |
|---|---|---|---|---|---|---|---|---|---|
| | Acc. % | Sen. % | Spec. % | Acc. % | Sen. % | Spec. % | Acc. % | Sen. % | Spec. % |
| All Images | 60.91 | 65.00 | 60.50 | 68.64 | 57.50 | 69.75 | 51.45 | 63.64 | 50.62 |
| All Polyps | 58.04 | 54.55 | 58.33 | 72.03 | 63.64 | 72.73 | 40.54 | 66.67 | 39.05 |
| NBI | 57.85 | 70.00 | 56.76 | 64.89 | 60.00 | 65.29 | 45.63 | 83.33 | 43.30 |
| NBI-F | 55.00 | 60.00 | 54.29 | 54.24 | 60.00 | 53.70 | 44.90 | 66.67 | 43.48 |
| NBI-N | 60.00 | 71.43 | 57.58 | 58.73 | 57.14 | 58.93 | 50.00 | 100.00 | 46.81 |
| WL | 54.14 | 54.55 | 54.10 | 72.93 | 45.45 | 75.41 | 48.08 | 16.67 | 50.00 |
| WL-F | 52.63 | 100.00 | 49.06 | 75.00 | 75.00 | 75.00 | 41.86 | 66.67 | 40.00 |
| WL-N | 52.54 | 50.00 | 52.83 | 62.71 | 33.33 | 66.04 | 45.00 | 33.33 | 45.95 |
| Near | 67.21 | 57.14 | 68.52 | 64.71 | 42.86 | 67.21 | 40.00 | 100.00 | 36.17 |
| Far | 66.67 | 60.00 | 67.21 | 64.06 | 60.00 | 64.41 | 39.62 | 66.67 | 38.00 |

Table 4

Fig. 10

| Modality | D-Caps Routing 2 | | | D-Caps Routing 3 | | | D-Caps Routing 4 | | | D-Caps Routing 5 | | |
|---|---|---|---|---|---|---|---|---|---|---|---|---|
| | Acc. % | Sen. % | Spec. % | Acc. % | Sen. % | Spec. % | Acc. % | Sen. % | Spec. % | Acc. % | Sen. % | Spec. % |
| All Images | 54.73 | 52.99 | 58.75 | 63.66 | 65.26 | 60.00 | 53.37 | 51.36 | 58.00 | 51.85 | 50.60 | 54.75 |
| All Polyps | 5061 | 49.82 | 52.27 | 65.53 | 71.12 | 53.79 | 45.97 | 40.79 | 56.82 | 50.86 | 48.74 | 55.30 |
| NBI | 51.18 | 46.92 | 60.33 | 56.69 | 54.23 | 61.98 | 50.66 | 44.23 | 64.46 | 50.92 | 42.69 | 68.60 |
| NBI-F | 49.04 | 42.11 | 67.86 | 53.37 | 51.97 | 57.14 | 59.13 | 57.24 | 64.29 | 50.96 | 45.39 | 66.07 |
| NBI-N | 47.14 | 39.61 | 67.86 | 60.95 | 59.74 | 64.29 | 59.52 | 61.04 | 55.36 | 53.33 | 44.81 | 76.79 |
| WL | 56.19 | 59.02 | 50.00 | 68.81 | 74.06 | 57.38 | 47.68 | 47.37 | 48.36 | 51.80 | 56.02 | 42.62 |
| WL-F | 60.09 | 62.50 | 53.45 | 72.48 | 75.63 | 63.79 | 49.08 | 53.13 | 37.93 | 59.17 | 62.50 | 50.00 |
| WL-N | 55.39 | 58.94 | 45.28 | 67.65 | 70.86 | 58.49 | 46.57 | 47.68 | 43.40 | 55.39 | 59.60 | 43.40 |
| Near | 48.20 | 45.96 | 54.10 | 67.57 | 70.19 | 60.66 | 50.90 | 54.04 | 42.62 | 54.50 | 51.55 | 62.30 |
| Far | 54.02 | 53.99 | 54.10 | 69.64 | 73.62 | 59.02 | 50.45 | 50.92 | 49.18 | 51.79 | 52.76 | 49.18 |

Table 5

Fig. 11

CAPSULES FOR IMAGE ANALYSIS

CROSS-REFERENCE TO RELATED APPLICATIONS

This nonprovisional application is a continuation of and claims priority to provisional application No. 62/680,411, entitled "Capsules for object segmentation," filed on Jun. 4, 2018, by the same inventors.

BACKGROUND OF THE INVENTION

1. Field of the Invention

This invention relates, generally, to object segmentation and classification within images. More specifically, it relates to improvements in the field of object segmentation and classification through the use of capsule networks, as opposed to convolutional neural networks, thereby increasing accuracy and efficiency of the segmented and/or classified objects.

2. Brief Description of the Prior Art

The task of segmenting objects from images can be formulated as a joint object recognition and delineation problem. The goal in object recognition is to locate an object's presence in an image, whereas delineation attempts to draw the object's spatial extent and composition (Bagci et al. [2012]). Solving these tasks jointly (or sequentially) results in partitions of non-overlapping, connected regions, homogeneous with respect to some signal characteristics. Object segmentation is an inherently difficult task; apart from recognizing the object, the object must also be labeled at the pixel level, which is an ill-posed problem.

Object segmentation in the medical imaging and computer vision communities has remained an interesting and challenging problem over the past several decades. Early attempts in automated object segmentation were analogous to the if-then-else expert systems of that period, where the compound and sequential application of low-level pixel processing and mathematical models were used to build-up complex rule-based systems of analysis. Over time, the community came to favor supervised techniques, where algorithms were developed using training data to teach systems the optimal decision boundaries in a constructed high-dimensional feature space. In computer vision fields, super-pixels and various sets of feature extractors such as scale-invariant feature transform (SIFT) (Lowe [1]) or histogram of oriented gradients (HOG) (Dalal and Triggs [2]) were used to construct these spaces. Specifically, in medical imaging, methods such as level sets (Vese and Chan [3]), fuzzy connectedness (Udupa and Samarasekera [4]), graph-based (Felzenszwalb and Huttenlocher [5]), random walk (Grady [6]), and atlas-based algorithms (Pham et al. [7]) have been utilized in different application settings.

Object segmentation literature is vast, both before and in the deep learning era. Herein, the most popular deep learning-based segmentation algorithms are summarized. In the last few years, deep learning methods, in particular convolutional neural networks (CNNs), have become the state-of-the-art for various image analysis tasks. For example, based on Fully Convolutional Networks (FCNs) (Long et al. [8]) for semantic segmentation, Ronneberger et al. [9] introduced an alternative CNN-based pixel label prediction algorithm, called U-Net, which forms the backbone of many deep learning-based segmentation methods in medical imaging today. Other encoder-decoder style CNNs have also been proposed, such as Mortazi et al. [10], which have become the desired models for various medical image segmentation tasks.

Following this, many subsequent works follow this encoder-decoder structure, experimenting with dense connections, skip connections, residual blocks, and other types of architectural additions to improve segmentation accuracies for particular medical imaging applications. For instance, a recent example by Jégou et al. [11] combines a U-Net-like structure with the very successful DenseNet (Huang et al. [12]) architecture, creating a densely connected U-Net structure, called Tiramisu. As another example, Mortazi et al. [13] proposed a multi-view CNN, following this encoder-decoder structure and adding a novel loss function, for segmenting the left atrium and proximal pulmonary veins from MRI. Other successful frameworks for segmentation are SegNet (Badrinarayanan et al. [14]), RefineNet (Lin et al. [15]), PSPNet (Zhao et al. [16]), Large Kernel Matters (Peng et al. [17]), ClusterNet (LaLonde et al. [18]), and DeepLab (Chen et al. [19]).

Examples of object segmentation applications in the medical field focus on anatomical and pathological segmentations. Recently, deep learning algorithms have been shown to be generally successful for image segmentation problems. Specific to radiology scans, accurately segmenting anatomical structures and/or pathologies is a continuing concern in clinical practice because even small segmentation errors can cause major problems in disease diagnosis, severity estimation, prognosis, and other clinical evaluations. Despite its importance, accurate segmentation of pathological lungs from CT scans remains extremely challenging due to a wide spectrum of lung abnormalities such as consolidations, ground glass opacities, fibrosis, honeycombing, tree-in-buds, and nodules (Mansoor et al. [20]).

In the field of object classification, leaps forward in progress are in large part due to advances in machine learning algorithms and specifically what has become known as deep learning. One of the first instances of these leaps forward came when AlexNet (Krizhevsky et al. [48]), bested the next closest state-of-the-art method for image classification on the ImageNet Large Scale Visual Recognition Challenge by more than 10.8%. At its core, deep learning owes its great success to its joining of two essential tasks-feature extraction and feature classification, learned in a joint manner, usually through a form of backpropagation. As such, deep learning is a step away from feature engineering, in which experts would hand-craft the most import set of discernible characteristics for a task, whereas classification of these features typically employed some form of machine learning. While this direction has dramatically improved the performance on a wide array of tasks, it has also come at a great cost, the sacrifice of human-level explainability.

Deep learning-based computer-aided diagnosis (CAD) systems have largely failed to be adopted into routine clinical work-flows. Unlike detection tasks, diagnosis (classification) requires radiologists to explain their predictions through the language of high-level visual attributes. For deep learning-powered CAD systems to be adopted by the healthcare industry and other high-risk domains, methods must be developed which can provide this same level of explainability. Towards this goal, a novel multi-task deep capsule-based architecture for learning visually-interpretable feature representations within the vectors of the capsules is proposed. The method can be applied to many computer vision problems, examples of which are described below, and include a high-impact healthcare problem of effective cancer diagnosis.

The CNNs, despite showing remarkable flexibility and performance in a wide range of computer vision tasks, inherently include their own sets of flaws. For example, due to the scalar and additive nature of neurons in CNNs, neurons at any given layer of a network are ambivalent to the spatial relationships of neurons within their kernel of the previous layer, and thus within their effective receptive field of the given input. In addition, most recent attempts in the computer vision and medical imaging literature utilize the extension of these methods to address the segmentation problem. Since the success of deep learning depends on finding an architecture to fit the task, currently several researchers are working on designing new and more complex deep networks to improve the expected outcome. This naturally brings high numbers of hyperparameters to be configured, making the overall network too complex to be optimized.

Recently Sabour et al. [21] introduced the idea of capsule networks, where information at the neuron level is stored as vectors, rather than scalars. These vectors contain information about spatial orientation, magnitude/prevalence, and other attributes of the extracted feature, with the information being represented by each capsule type of that layer. These sets of neurons, henceforth referred to as capsule types, are then "routed" to capsules in the next layer via a dynamic routing algorithm which takes into account the agreement between these capsule vectors, thus forming meaningful part-to-whole relationships not found in standard CNNs. As shown in FIG. 1, a simple three-layer capsule network showed remarkable initial results in Sabour et al. [21], producing state-of-the-art classification results on the Modified National Institute of Standards and Technology (MNIST) dataset and relatively good classification results on the Canadian Institute for Advanced Research (CIFAR-10) dataset. Since then, researchers have begun extending the idea of capsule networks to other applications; nonetheless, no work yet exists in literature for a method of capsule-based object segmentation or explainable diagnosis.

Performing object segmentation with a capsule-based network is difficult for a number of reasons. The original capsule network architecture and dynamic routing algorithm is extremely computationally expensive, both in terms of memory and run-time. Additional intermediate representations are needed to store the output of "child" capsules in a given layer while the dynamic routing algorithm determines the coefficients by which these children are routed to the "parent" capsules in the next layer. This dynamic routing takes place between every parent and every possible child. One can think of the additional memory space required as a multiplicative increase of the batch size at a given layer by the number of capsule types at that layer. The number of parameters (i.e. object size and shape, pixel distribution, spatial resolution, signal-to-noise ratios, etc.) required quickly swells beyond control as well, even for trivially small inputs such as MNIST and CIFAR-10. For example, given a set of 32 capsule types with 6×6, 8D-capsules per type, being routed to 10×1, 16D-capsules, the number of parameters for this layer alone is 10× (6×6×32)×16×8=1, 474,560 parameters.

Accordingly, what is needed is a more efficient system through which capsule networks can perform object segmentation, thereby decreasing the cost, time, and memory space required to accurately analyze images. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for an efficient method of accurately performing object segmentation is now met by a new, useful, and nonobvious invention.

The novel method includes the steps of receiving an input image at a computing device, and passing the input image through a convolutional layer. By passing the image through a convolutional layer, the method produces a plurality of feature maps of spatial dimensions for the input image. The feature maps form a set of children capsules that have an associated set of parameters. The set of parameters and children capsules are then used to create a set of prediction vectors that are locally-constrained within each of the parent capsules' kernels, in an effort to produce locally-accurate predictions for components of the input image. The prediction vectors are used to determine a set of parent capsules that are selected after comparing the prediction vectors—the computing device calculates the likelihood that a certain prediction vector is correct based on the agreement between itself and the other prediction vectors for a given parent capsule. To reduce memory and parameter burden on the computing device, the set of parameters is shared for all children capsules within each capsule type and utilized to ensure accuracy throughout the process. Finally, the input image is reconstructed by using the above information, and via a masked segmentation process. During the masked segmentation process, the prediction vectors associated with the input image are mapped, and all other pixels are treated as background. As such, the method provides for the segmentation of input image components, the accurate prediction of the components based on the prediction vectors, and the reconstruction of the input image after performing the segmentation steps above.

An object of the invention is to decrease the space, time, and monetary costs associated with object segmentation, while increasing the accuracy of object segmentation methods, allowing for a computing device to recognize images in a batch that are similar to an input image.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 3 is a representation of an algorithm and a set of instructions for locally-constrained dynamic routing, according to an embodiment of the present invention.

FIG. 4 is a table (Table 1) depicting object segmentation performed according to prior art methods and compared with methods, specifically showing the Dice Coefficient results on a 4-fold cross-validation split of the LUNA 16 dataset, according to an embodiment of the present invention. For the SegCaps (R1) row, dynamic routing is only performed on layers which change spatial dimensions. All other layers are routed with equal-weight coupling coefficients.

FIG. 8 is a table (Table 2) depicting the classification of hyperplastic versus adenoma images of the Mayo Dataset, with NBI denoting narrow-band imaging, WL denoting white light endoscopy, and -F and -N denoting far and narrow focused magnifications, respectively.

FIG. 9 is a table (Table 3) depicting the classification of hyperplastic versus adenoma versus serrated images of the Mayo Dataset, with NBI denoting narrow-band imaging, WL denoting white light endoscopy, and -F and -N denoting far and narrow focused magnifications, respectively.

FIG. 10 is a table (Table 4) depicting the classification of hyperplastic versus serrated images of the Mayo Dataset, with NBI denoting narrow-band imaging, WL denoting white light endoscopy, and -F and -N denoting far and narrow focused magnifications, respectively.

FIG. 11 is a table (Table 5) depicting the effects of routing iteration on the Mayo Dataset for hyperplastic versus adenoma images.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes an improved method of performing object segmentation that reduces the memory required to perform the segmentation, while increasing segmentation accuracy. Convolutional neural networks (CNNs) have shown remarkable results over the last several years for a wide range of computer vision tasks. A new architecture recently introduced by Sabour et al. [21], referred to as capsule networks with dynamic routing, has shown great initial results for digit recognition and small image classification. The success of capsule networks lies in their ability to preserve more information about the input by replacing max-pooling layers with convolutional strides and dynamic routing, allowing for preservation of part-whole relationships in the data. This preservation of the input is demonstrated by reconstructing the input from the output capsule vectors. The present invention expands the use of capsule networks to the task of object segmentation for the first time in the literature; extends the idea of convolutional capsules with locally-connected routing and propose the concept of deconvolutional capsules; and extends the masked reconstruction to reconstruct the positive input class. The convolutional-deconvolutional capsule network, referred to as SegCaps, shows strong results for the task of object segmentation with substantial decrease in parameter space.

Figure 2:
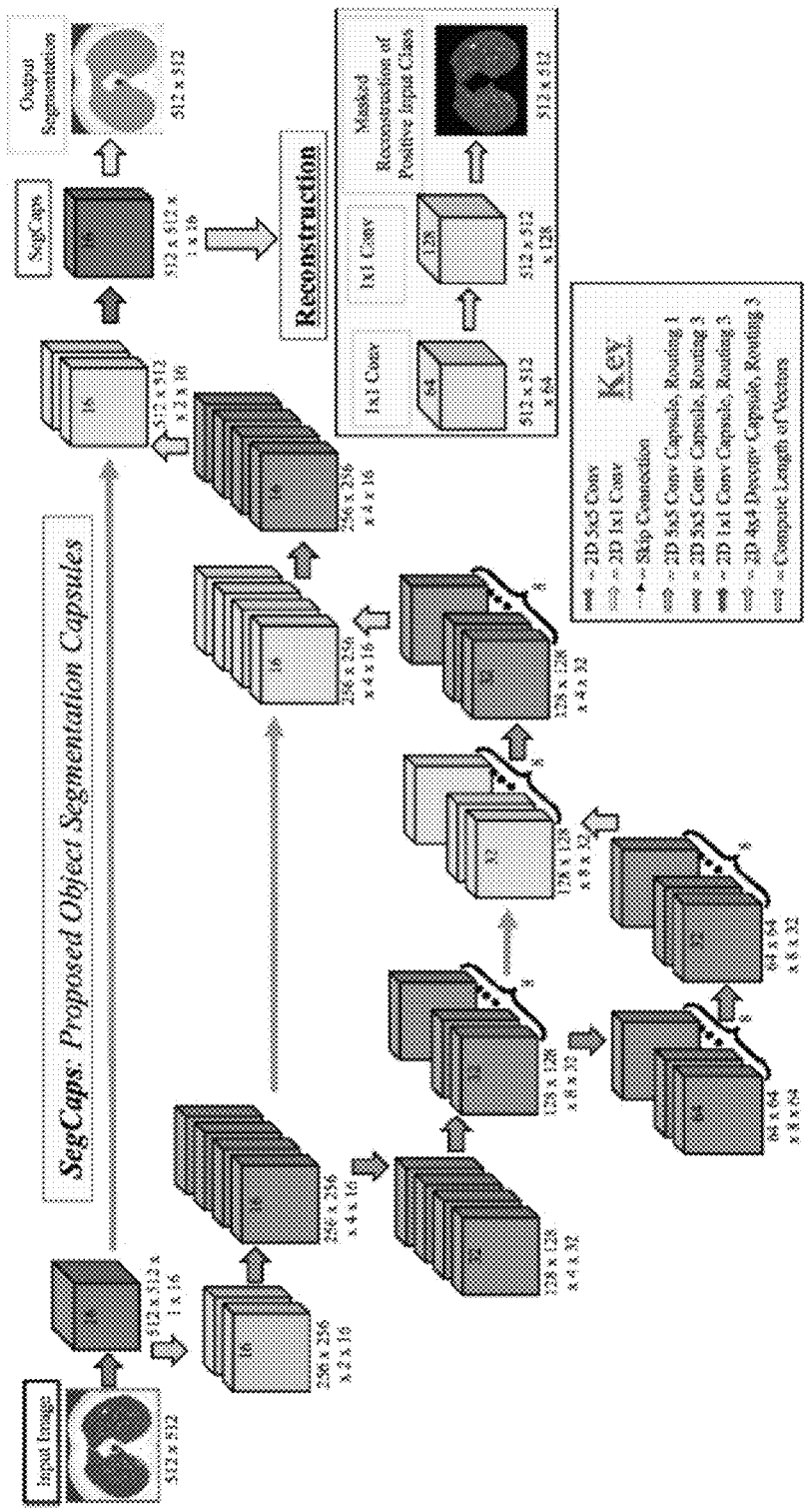
FIG. 2 is a process-flow diagram depicting an architecture for object segmentation, according to an embodiment of the present invention.

As illustrated in FIG. 2, the input to the SegCaps network is a 512×512-pixel image, which is depicted in FIG. 2 as a slice of a CT Scan. This image is passed through a 2D convolutional layer which produces 16 feature maps of the same spatial dimensions. This output forms the first set of capsules, with a single capsule type represented by a grid of 512×512 capsules, each of which is a 16-dimensional vector. This is then followed by the first convolutional capsule layer. The process can be generalized to any given layer l in the network.

At layer l, $\exists$ a set of capsule types $T^l = \{t_1^l, t_2^l, \ldots t_n^l | n \in \mathbb{N}\}$. For every $t_i^l \in T^l$, $\exists$ an $h^l \times w^l$ grid of $z^l$-dimensional child capsules, $C = \{c_{11}, \ldots, c_{1w^l}, \ldots, c_{h^l 1}, \ldots, c_{h^l w^l}\}$, where $h^l \times w^l$ is the spatial dimensions of the output of layer l−1. At the next layer of the network, l+1, $\exists$ a set of capsule types $T^{l+1} = \{t_1^{l+1}, t_2^{l+1}, \ldots t_m^{l+1} | m \in \mathbb{N}\}$. And for every $t_j^{l+1} \in T^{l+1}$, $\exists$ an $h^{l+1} \times w^{l+1}$ grid of $z^{l+1}$-dimensional parent capsules, $P = \{p_{11}, \ldots, p_{1w^{l+1}}, \ldots, p_{h^{l+1} 1}, \ldots, p_{h^{l+1} w^{l+1}}\}$, where $h^{l+1} \times w^{l+1}$ is the spatial dimensions of the output of layer l.

In convolutional capsules, every parent capsule $p_{xy} \in P$ receives a set of "prediction vectors," $\{\hat{u}_{xy|t_1^l}, \hat{u}_{xy|t_2^l}, \ldots, \hat{u}_{xy|t_n^l}\}$, one for each capsule type in $T^l$. Hence, this set is defined as the matrix multiplication between a learned transformation matrix, $M_{t_i^l}$, and the sub-grid of child capsules outputs, $U_{xy|t_i^l}$, within a user-defined kernel centered at position (x, y) in layer l; hence, $\hat{u}_{xy|t_i^l} = M_{t_i^l} \cdot U_{xy|t_i^l}, \forall t_i^l \in T^l$. Therefore, we can see each $U_{xy|t_i^l}$ has shape $k_h \times k_w \times z^l$, where $k_h \times k_w$ are the dimensions of the user-defined kernel. Each $M_{t_i^l}$ has shape $k_h \times k_w \times z^l \times |T^{l+1}| \times z^{l+1}$ for all capsule types $T^l$, where $|T^{l+1}|$ is the number of parent capsule types in layer l+1. Each $M_{t_i^l}$ does not depend on the spatial location (x, y), as the same transformation matrix is shared across all spatial locations within a given capsule type (similar to how convolutional kernels scan an input feature map). Conversely, the proposed method can exploit parameter sharing to dramatically cut down on the total number of parameters to be learned. The values of these transformation matrices for each capsule type in a layer are learned via the backpropagation algorithm with a supervised loss function.

To determine the final input to each parent capsule $p_{xy} \in P$, the weighted sum is computed over these "prediction vectors," $p_{xy} = \Sigma_n r_{t_i^l|xy} \hat{u}_{xy|t_i^l}$, where $r_{t_i^l|xy}$ are the routing coefficients determined by the dynamic routing algorithm. These routing coefficients are computed by a "routing softmax,"

$$r_{t_i^l|xy} = \frac{\exp(b_{t_i^l|xy})}{\sum_k \exp(b_{t_i^l})}, \quad (1)$$

whose initial logits, $b_{t_i^l|xy}$ are the log prior probabilities that prediction vector $\hat{u}_{xy|t_i^l}$ should be routed to parent capsule $p_{xy}$.

The method differs from the dynamic routing implemented by Sabour et al. [2017] in at least two ways. First, the creation of the prediction vectors is locally constrained. Second, the child capsules are only routed within the user-defined kernel to the parent, rather than routing every single child capsule to every single parent. The output capsule is then computed using a non-linear squashing function, $$v_{xy} = \frac{\|p_{xy}\|^2}{1+\|p_{xy}\|^2} \frac{p_{xy}}{\|p_{xy}\|}, \quad (2)$$

where $v_{xy}$ is the vector output of the capsule at spatial location (x, y) and $p_{xy}$ is its final input. Lastly, the agreement is measured as the scalar product at $a_{t_i^l|xy} = v_{xy} \cdot \hat{u}_{xy|t_i^l}$. A final segmentation mask is created by computing the length of the capsule vectors in the final layer and assigning the positive class to those who magnitude is above a threshold, and the negative class otherwise. The pseudocode for this locally constrained dynamic routing is summarized in Algorithm 1, which is depicted in FIG. 3.

As a method of regularization, the idea of reconstructing the input is extended to promote a better embedding of the input space. This forces the network to not only retain all necessary information about a given input, but also encourages the network to better represent the full distribution of the input space, rather than focusing only on its most prominent modes. Since the method seeks only to model the distribution of the positive input class and treat all other pixels as background, the method masks out segmentation capsules which do not belong to the positive class and reconstructs a similarly masked version of the input image. The reconstruction is performed via a three layer 1×1 convolutional network, a weighted mean-squared error (MSE) loss computed between only the positive input pixels and this reconstruction.

Example 1

Experiments were conducted on the LUNA16 subset of the LIDC-IDRI database, randomly split into four training/testing folds for performing k-fold cross-validation. The LUNA 16 subset contains a range of lung CT scans from severe to no pathologies present. Ground-truth annotations were provided in the form of segmentation masks created by an automated algorithm (van Rikxoort et al. [22]). Manual inspection led to the removal of 10 of the 888 CT scans due to exceedingly poor annotations. Because of the lack of expert human-annotations, the proposed methods and baselines were observed to typically outperform these ground-truth segmentation masks for particularly difficult scans. This, in turn, lead to higher dice scores for worse performance in those cases, as they typically failed in a similar way. To compensate for such outliers, all numeric results are reported in terms of median rather than mean averages.

Figure 1:
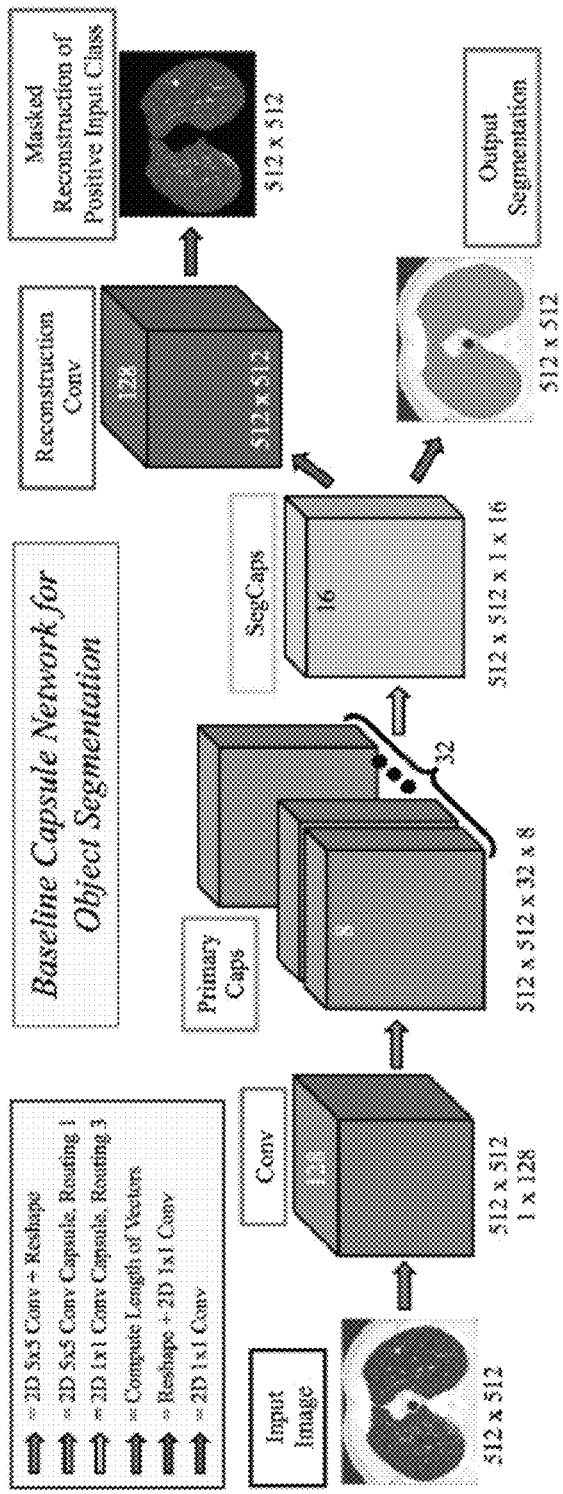
FIG. 1 is an example of a three-layer capsule segmentation network similar to that of Sabour et al. [21], however including a locally-constrained dynamic routing algorithm, and a masked reconstruction of the positive input class, according to an embodiment of the present invention.

U-Net, Tiramisu, the three-layer baseline capsule segmentation network (as shown in FIG. 1), and the proposed system (as shown in FIG. 2) are all implemented using Keras with TensorFlow. For the baseline capsule network, the margin loss from Sabour et al. [21] was modified to a weighted binary version. All other methods are trained using the weighted binary cross-entropy (BCE) loss for the segmentation output. In small-scale experiments, the weighted margin loss seemed to perform comparable to the weighted BCE loss for the system. The reconstruction output loss is computed via the masked MSE as described above. All possible experimental factors are controlled between different networks. All networks are trained from scratch, using the same data augmentation methods (scale, flip, shift, rotate, elastic deformations, and random noise) and Adam optimization (Kingma and Ba [23]) with an initial learning rate of 0.00001. A batch size of 1 is chosen for all experiments to match the original U-Net implementation. The learning rate is decayed by a factor of 0.05 upon validation loss stagnation for 50,000 iterations and early stopping is performed with a patience of 250,000 iterations based on validation dice scores.

As shown in FIG. 4, the final quantitative results of these experiments are shown in Table 1. The system slightly outperforms all other compared approaches with an average dice score of 98.479%, while requiring far fewer parameters, a reduction in parameters of over 95% from U-Net and over 38% compared with Tiramisu.

Figure 5:
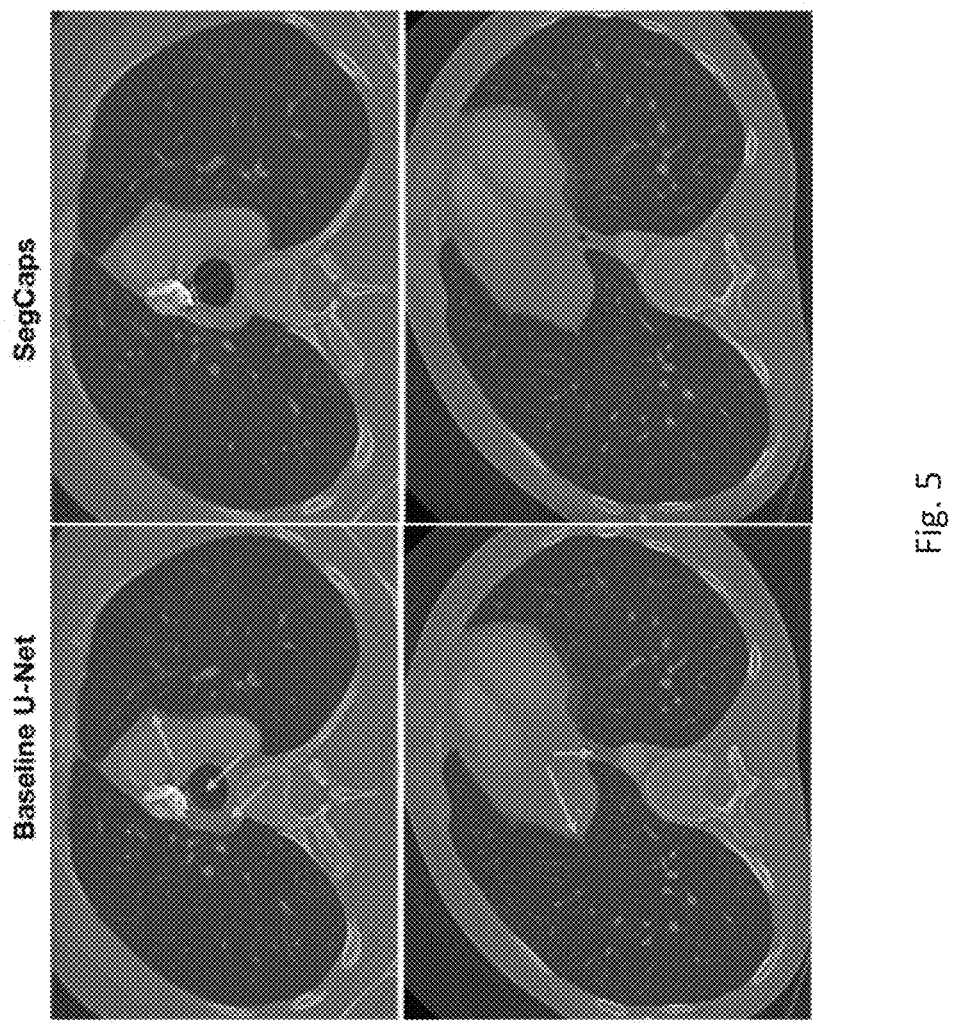
FIG. 5 is a comparison of a prior art method with a method according to an embodiment of the present invention, including highlights of the segmentation errors of the prior art method.

As shown in FIG. 5, two different slices from two different CT scans were analyzed. FIG. 5 depicts a comparison between a prior art method of object segmentation, denoted by the Baseline U-Net column, and the method of object segmentation of the present invention, denoted by the SegCaps column (with the SegCaps column representing the proposed system). The Baseline U-Net column shows inaccuracies (segmentation leakages) from the original object, as denoted by the arrows in FIG. 5—these inaccuracies are likely due to inaccuracies in the object segmentation process. As shown in the SegCaps column, these inaccuracies are not present in the object segmentation performed by the embodiment of the present invention. As such, the comparison shows that the SegCaps column more accurately segmented the objects from the CT scan.

Figure 6:
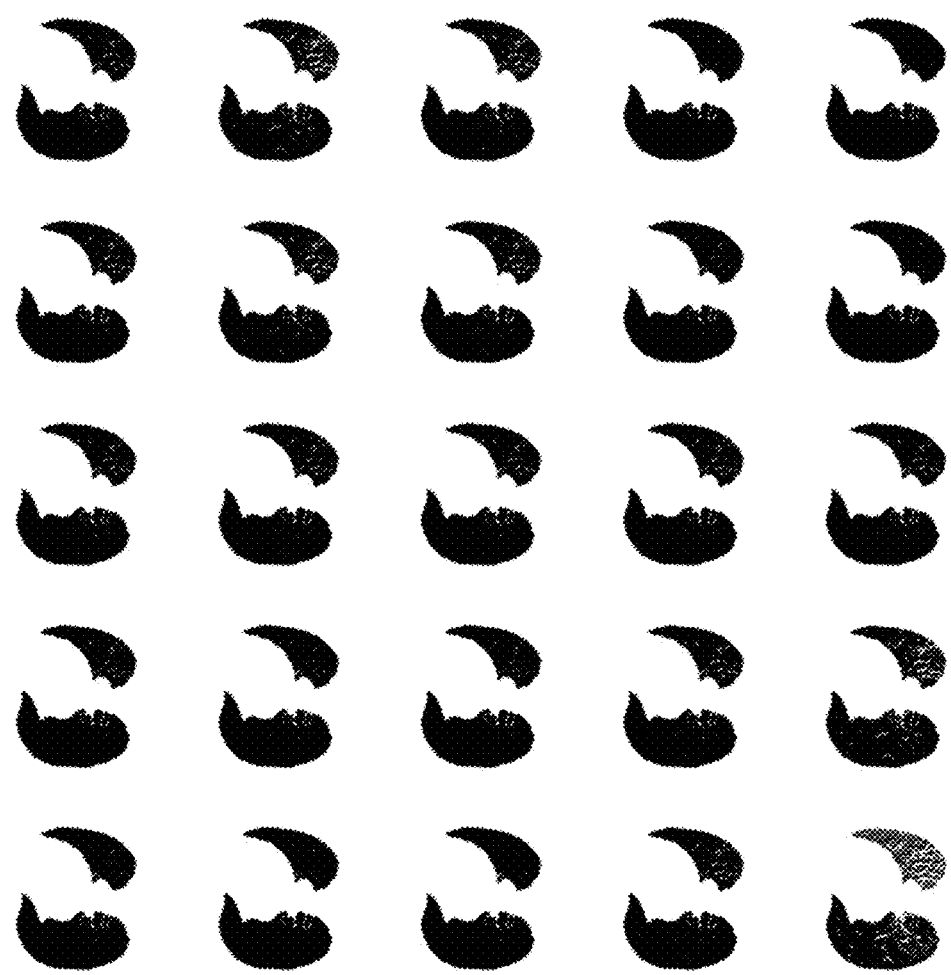
FIG. 6 is an example of the segmentation of a particular image according to different selected visual attributes and capsule segmentation vectors.

As shown in FIG. 6, an embodiment of the present invention was analyzed to investigate how different capsule vectors in the final segmentation capsule layer represented different visual attributes. FIG. 6 shows five rows and five columns. Each row includes five selected visual attributes (selected from sixteen-dimensional capsule segmentation vectors). Each column indicates different visual attributes of the selected vectors for a given interval that is obtained from the capsule segmentation vector. The results of the analysis depicted in FIG. 6 shows that regions with different textural properties (i.e., small and large homogeneous) are progressively captured by the capsule segmentation vectors.

The proposed deep learning algorithm for object segmentation, called SegCaps, showed its efficacy in a challenging problem of pathological lung segmentation from CT scans. The proposed framework is the first use of the recently introduced capsule network architecture and expands it in several significant ways. First, the original dynamic routing algorithm is modified to act locally when routing children capsules to parent capsules and to share transformation matrices across capsules within the same capsule type. These changes dramatically reduce the memory and parameter burden of the original capsule implementation and allows for operating on large image sizes, whereas previous capsule networks were restricted to very small inputs. To compensate for the loss of global information, the concept of a deep convolutional-deconvolutional capsule architecture for pixel level predictions of object labels was introduced. Finally, the masked reconstruction of the target class was extended as a regularization strategy for the segmentation problem. Experimentally, the system produces slightly improved accuracies for lung segmentation on the LUNA16 subset of the LIDC-IDRI database, in terms of dice coefficient, when compared with state-of-the-art networks U-Net (Ronneberger et al. [9]) and Tiramisu (Jégou et al. [11]). More importantly, the proposed system architecture contains 95.4% fewer parameters than U-Net and 38.4% fewer than Tiramisu. The proposed algorithm fundamentally improves the current state-of-the-art object segmentation approaches, and provides strong evidence that capsules can successfully model the spatial relationships of the objects better than traditional CNNs.

Finally, as noted above, a single layer of a typical capsule network system, operating on only 6×6-pixel inputs, may include around 1.5 million parameters, however, in the present invention, the entire deep convolutional-deconvolutional capsule network with local-constrained dynamic routing operates on 512×512-pixel inputs, and includes roughly the same number of parameters in its entire network as that single layer.

Example 2

Colorectal cancer is one of the leading causes of cancer-related death worldwide, with the majority of colorectal cancer cases arising from precursor legions that are referred to as polyps. These polyps are typically classified into one of three categories: 1) hyperplastic; 2) serrated (comprised of sessile serrated adenomas and traditional serrated adenomas); and 3) adenomas. Hyperplastic polyps are considered benign and can safely be left in situ; however, serrated polyps and adenomas are considered premalignant and should be resected during colonoscopy. Typically, polyp diagnosis and classification is performed by taking a sample and performing a histopathological analysis, commonly referred to as a biopsy. However, biopsies are time-consuming and expensive, and can present perforation and bleeding risks for some patients. As such, it is desirable to provide an optical method of analyzing a polyp to efficiently and safely determine whether a polyp is likely to be benign, or whether the polyp is premalignant or malignant and requires removal.

Attempts have been made to provide colonoscopy screening technologies, including the introduction of narrow-band imaging (NBI), which uses a blue light optical imaging modality to enhance mucosal detail and vascular structures. This improves over traditional white light (WL) endoscopies, which do not highlight or enhance the details provided by NBI methods. However, test accuracies and sensitivities under such methods remain below recommended levels [24-26]. Moreover, current consensus guidelines suggest the removal and pathological evaluation of all visualized polyps; however, such practice is expensive and often unnecessary, presenting risks to the patients while removing some polyps that may not require removal [27]. Accordingly, there is a need for a computer-aided diagnosis (CAD) system to efficiently provide polyp diagnosis during colonoscopy, such as the deep capsule system discussed in detail above. In particular, there is a need to diagnose polyps having a challenging appearance, such as clouded surfaces, irregular shapes, and dark spots.

CAD systems have been used to train data sets for classifying hyperplastic polyps versus adenomas. For example, in [28], 3D shape information from colonoscopy video was extracted using Structure-from-Motion, color, and texture features. Deep learning was incorporated in [29] by extracting the first 3-4 layers of a network trained to classify the extracted deep features. The first end-to-end trained network employed an AlexNet style network trained from scratch with data augmentation to classify polyps as hyperplastic, adenomas, neither, or unsuitable images [30]. The test with the highest accuracy used a pretrained Inceptionv3 network with a new top layer trained to classify hyperplastic polyps from adenomas [31].

Figure 7:
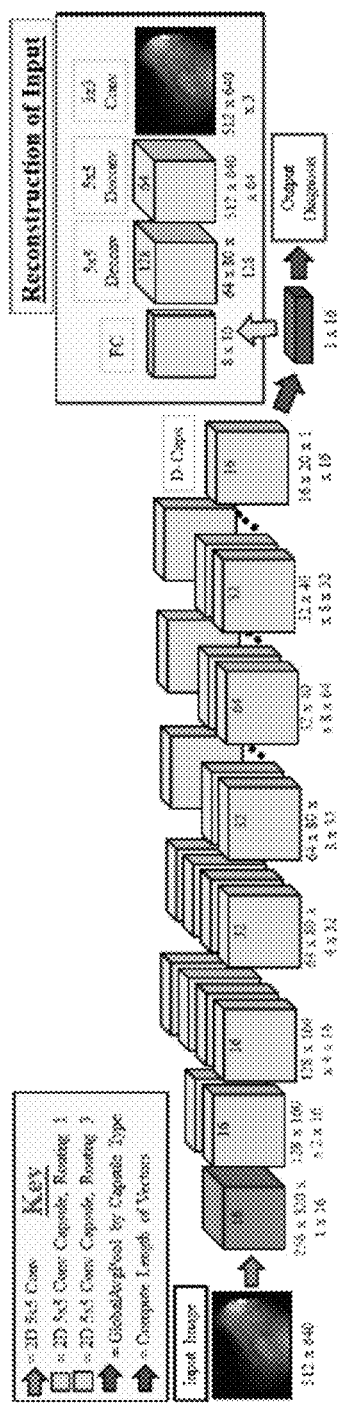
FIG. 7 is an overview of the system as applied to colonoscopy images, in accordance with an embodiment of the present invention (referred to as D-Caps).

The system discussed in Example 1 above was applied to a data set including colorectal polyp images, as shown in FIG. 7, and referred to a D-Caps. The input to the network is a 512×640×3 color image taken during a colonoscopy screening and sent through an initial convolutional layer that downsamples the image and extracts the basic low-level feature information (edges and corners). The output of the process is then reshaped to be treated as a convolutional capsule with a single capsule type. These feature vectors are then passed to the first convolutional capsule layer, referred to as the primary capsules and a second capsule type is added. Following this, all further layers are convolutional capsule layers with locally connected dynamic routing.

In each capsule layer, there are individual capsules which form a grid. Then, at each layer, there are multiple sets of these grids which form the capsule types. Capsules within a lower layer are referred to as child capsules and in a higher layer being routed to as parent capsules. The locally connected dynamic routing works by forming prediction vectors over a kernel of the child capsules centered at the location of the set of parent capsule types. For every parent capsule at a given (x, y) position, a set of prediction vectors are formed via the multiplication between a locally-defined window and a transformation matrix which is shared across the spatial dimension (but not the capsule type dimension). These transformation matrices act analogous to affine transformation in feature space, allowing for a strong notion of equivariance to input features. Once prediction vectors are formed for a given (x, y) location, and therefore for a set of parent capsules, the modified dynamic routing algorithm then routes all child capsules to all parents capsules only at that given spatial location. One can think of this as sort of "convolutionalized" dynamic routing. By following this method, the size of the images can be dramatically increased beyond the likes of MNIST, CIFAR-10 and smallNORB.

During training, the backpropagation signal updates the weight transformation matrices which form the prediction vectors. The weights used to route these prediction vectors are not learned but are rather a measure of agreement between all child capsules and any given parent capsule. To determine the final input to each parent capsule, after the specified number of routing iterations takes place, wherein a weighted sum is computed by a routing softmax function, a non-linear squashing function is applied. The final output capsule vector is computed by $$p_{nm} = \frac{\|v_{nm}\|^2}{1 + \|v_{nm}\|^2} \frac{v_{nm}}{\|v_{nm}\|}, \qquad (3)$$

where $v_{nm}$ is the final input on the last routing iteration.

To make the system more efficient, full-connect capsules were removed in favor of global average pooling. For multi-class classification, we produce a capsule type for each output class. The tensors are then split along the capsule type dimension into individual capsule types. Global average pooling is then performed to reduce the spatial dimension to a flat array of length equal to the length of the final output capsule vector. These vectors are then recombined into an (n×a) tensor where n is the number of classes and a is the vector length of the output. To decide a class score, the magnitude of each vector is computed, where the longest vector is chosen as the prediction. In the case where multiple images of the same polyp were given, the votes for each images are averaged, weighted by the relative confidence of the vote being cast.

Reconstruction of the input is then performed via a dense layer followed by two deconvolutions and a final convolution. The reason for the final convolution is to remove artifacts produced by the upsampling in the previous deconvolution layers. The reconstruction serves the purpose of providing a learned inverse mapping from output to input, in order to help preserve a better approximation of the distribution of the input space. Without the inverse mapping, the network will be prone to only learn the most common modes in the training dataset.

An advantage of the proposed D-Caps architecture is the relatively small number of parameters needed to achieve high performance. The D-Caps architecture shown in FIG. 7 contains only 1.3 million parameters, as compared to the 24 million in the Inceptionv3 network, a relative reduction of 95%.

Experiments were performed on a colorectal polyp dataset, referred to herein as Mayo, collected at the Mayo Clinic, Jacksonville by [27] with an institutional review board approval. A total of 552 patients were included in this study with 963 polyps collected. Polyps were collected from both a standard colonoscope and a dual-focus colonoscope. The dual focus colonoscope contains near and far modes for both WL and NBI settings, referred to as WLN, WL-F, NBI-N, and NBI-F. In this dataset, a subset of very challenging cases/images of each polyp type are chosen by expert interpreters (usually just one of each imaging type). Therefore, in terms of images, the Mayo dataset is a very small and challenging dataset. Experiments were conducted using stratified 10-fold cross validation.

Three sets of data experiments were conducted. In the first set, images were split into two categories, hyperplastics and adenomas (with serrated adenomas excluded). In the second set, images were split again into two categories now with serrated adenomas included in the adenoma class. In the third set, images were split between hyperplastics and serrated adenomas with the adenoma images excluded. With 10-fold cross-validation, three sets of experiments, and three models being trained, a total of 90 experiments were conducted. Additionally, another round of experiments was conducted on the hyperplastic vs adenomas with the Mayo dataset while varying the amount of dynamic routing iterations performed inside D-Caps.

All networks were trained and tested on a single Titan X GPU using the Keras and TensorFlow frameworks. For Inceptionv3 trained from scratch, a batch size of 8 was used with the Adam optimizer at its default settings. For Inceptionv3 fine-tuned, the base network layers had their weights frozen and a global average pooling layer was added, followed by a fully-connected layer with 1024 nodes and then a final fully-connected layer with a single output and sigmoid activation. The initial learning rate was lowered to 0:0001 on Adam due to the process starting from trained weights. The batch size was lowered to 4 for the SegCaps method described above. The loss function for all networks was a binary cross-entropy.

Figure 12:
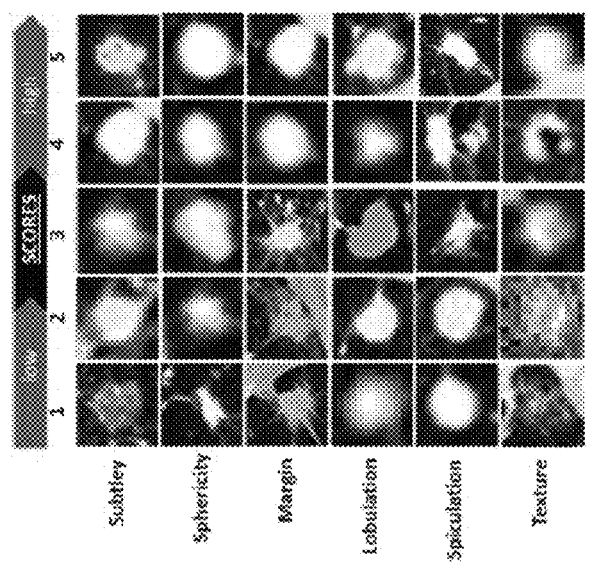
FIG. 12 is an example of lung nodules including high-level visual attribute scores as determined by radiologists, with scores ranging from 1-5 for six different visual attributes related to lung cancer screening.

The results of the three sets of experiments in presented in Tables 2-5, which appear in FIGS. 8-11, respectively. Tables 2-4 contain the results for the three experiments on the Mayo dataset. The final table, Table 5, contains a study of the effect of routing iterations on the D-Caps network. For all experiments, results are presented at several levels of analysis. In the first row (All Images), classification results are presented for every image present in the dataset. In the row All Polyps are the diagnosis results, where a weighted average is taken across all votes for a given polyp to give a final diagnosis score. All further rows present results at the polyp level and not the image level (as this work is focused on diagnosis and not image classification). The row NBI contains the score for all narrow-band imagery results including standard colonoscopes and dual-focus colonoscopes (i.e. near and far focus modes: NBI-N and NBI-F respectively). The rows NBI-F and NBI-N are the results of using the respective focus mode of the dual focus NBI imaging. The following three WL, WL-F, and WL-N follow the same logic as the NBI, NBI-F, NBI-N rows. The Near and Far rows present results combining WL-N with NBI-N and WL-F with NBI-F respectively. Some qualitative figures of difficult cases is shown in FIG. 12; however, the majority of the images in the set resulted in a successful classification.

The proposed D-Caps architecture shows strong performance on this particularly challenging colonoscopy imaging data, where D-Caps consistently outperformed Inceptionv3 by a significant margin when both networks were trained from scratch. Although Inceptionv3 was able to achieve slightly high results when pre-trained on ImageNet, it is not unreasonable to suspect D-Caps would see a similar rise in performance if pre-trained. While all CAD methods compared still fall below human expert level diagnosis numbers, the current performance is comparable or above the typical non-expert endoscopists, and further work could be done to improve these numbers more. Furthermore, the D-Caps architecture has been shown to be extremely efficient compared to other deep network architectures for the same diagnosis tasks while maintaining the overall diagnostic accuracy. Overall, the proposed CAD system shows promising accuracy and efficiency for a small but very challenging dataset, wherein automatic differentiation of polyps increases cost-efficiency of the current standards.

The most apparent future work to investigate would be to first localize the polyps before attempting diagnosis, as many times polyps were only a very small portion of the image. This procedure is called 'detection'. Incorporating a region of interest as a result of detection procedure and conducting the automated diagnosis procedure will highly likely improve the diagnostic rate. One may improve optimization of the network with an automated way (such as deep reinforcement learning or genetic algorithms) instead of empirically and experimentally defined hyperparameters. The capsule network can benefit from such approaches largely because the literature for capsule network, its parameters, and the harmony between its components are subject to extensive investigations and automated optimization algorithms can help filling such knowledge gaps.

Example 3

Lung cancer is the leading cause of cancer-related deaths in both men and women, and is incurable in the majority of cases due to the advanced stage at the time of most diagnoses. The National Lung Screening Trial (NLST) showed that screening patients with low-dose computed tomography (CT) has reduced lung cancer specific mortality by 20% [32, 33]. Despite this promising increase in screening technology, only 16% of lung cancer cases are diagnosed at an early stage [34]. The reasons behind this low diagnosis rate at an early stage are due to the screening/diagnosis related challenges including (a) high false positive rates, (b) over-diagnosis, and (c) missed tumors during screening [35]. Based on DL models such as 2D and 3D deep convolutional neural networks (CNN), there have been large number of studies conducted to alleviate these challenges [36-46], and such explorations were partially successful and improved both nodule detection and image-based diagnostic rates drastically. Noticeably, a few of them achieved highly successful diagnosis results, comparable to or even better than expert level diagnosis [40]. However, black-box nature of the machine generated results did not help these methods to make their way into clinical routine. In other words, previous studies have failed to demonstrate a link between the machine generated results and its explanation, which can be provided through the capsule-based networks discussed in detail above.

Radiologists typically use six high-level visual attributes for determining the malignancy status of a screen detected nodule: calcification, spiculation, sphericity, lobulation, margin, and texture. Each of these attributes are interpretable and there are moderate to significant associations between malignancy status vs. these attributes. Using the methods described herein, these visual attributes are modelled with capsules. Since radiologists' scores for both malignancy and visual characteristics vary significantly between each other for a given nodule, it is not possible to train the proposed network directly against these scores. Previous works instead train against the mean of the radiologist scores and convert the mean to a binary label (malignant or benign). However, this throws away significant information. In the capsule method, a Gaussian distribution of mean and variance equal to that of the radiologists' scores for a given nodule is used, and the mean squared error between this and the network output is computed for supervised training. In this way, overconfidence by the network on more ambiguous nodules is punished in proportion to radiologists' agreement, and likewise for underconfidence. This additionally provides for the production of classification scores across all five possible score values, rather than simply binary classifications.

The method was trained and tested on the Lung Image Database Consortium and Image Database Resource Initiative (LIDC-IDRI) [47]. In short, radiologists visually labeled a collection of lung nodules with scores ranging from 1-5 across a set of visual characteristics, indicating their relative appearance. These characteristics and scores shown in FIG. 12. For the task of lung nodule malignancy classification, nodules are visually labeled by radiologists with the same 1-5. The method models these visual attributes using capsule neural networks, while simultaneously performing malignancy prediction, and nodule segmentation.

Figure 13:
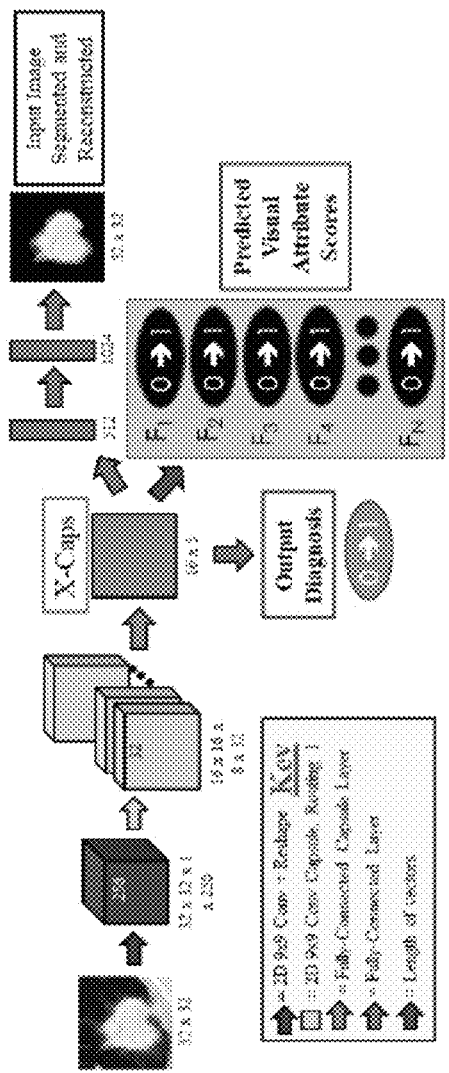
FIG. 13 is an overview of the system as applied to lung nodule images, in accordance with an embodiment of the present invention (referred to as X-Caps).

The first approach, referred to as explainable capsules, or X-Caps, shown in FIG. 13, was designed to be similar to the methods discussed above, while providing for more control over the visually-interpretable features learned by the capsule vectors. The ability of capsules to model specific visual attributes within their vectors was examined, rather than simply hoping some are learned successfully in the much more challenging lung nodule data. As shown in FIG. 13, the X-Caps method includes the addition of supervised labels provided for each dimension of the vectors. To compute a final malignancy score, a fully-connected layer is attached to all six of these vectors with a sigmoid activation. The output labels have their values called to [0, 1] to allow for easier training with the activation functions.

The input was also reconstructed as a form of regularization, with the regularization extended to perform a sudo-segmentation. Whereas in segmentation, the goal is to output a binary mask of pixels which belong to the nodule region, in the formulation only the pixels which belong to nodule region are reconstructed, with the remaining pixels being mapped to zero. More specifically, $$R^{x,y} = I^{x,y} \times S^{x,y} \mid S^{x,y} \in \{0, 1\}, \text{ and} \tag{4}$$

$$L_R = \frac{\gamma}{X \times Y} \sum_x^X \sum_y^Y \|R^{x,y} - O_r^{x,y}\|, \tag{5}$$

where $L_R$ is the supervised loss for the reconstruction regularization, $\gamma$ is a weighting coefficient for the reconstruction loss, $R^{x,y}$ is the reconstruction target pixel, $S^{x,y}$ is the ground-truth segmentation mask value, and $O_r^{x,y}$ is the output of the reconstruction network at pixel location (x, y), respectively, and X and Y are the width and height of the input image, respectively. This adds another task to the multitask learning approach and an additional supervisory signal that can help distinguish visual characteristics from background noise. The malignancy prediction score, as well as each of the visual attribute scores, also provide a supervisory signal in the form of $$L_a = \Sigma_n^N a^n \|A^n - O_a^n\|, \text{ and} \tag{6}$$

$$L_m = \beta \|M - O_m\|, \tag{7}$$

where $L_a$ is the combined loss for the visual attributes, $A^n$ is the average of the attribute scores given by, at minimum, three radiologists for attribute n, N is the total number of attributes, $a^n$ is the weighting coefficient places on the $n^{th}$ attribute, $O_a^n$ is the network prediction for the score of the $n^{th}$ attribute, $L_m$ is the loss for the malignancy score, M is the average of the malignancy scores given by, at minimum, three radiologists, $O_m$ is the network prediction for the average malignancy score, and $\beta$ is the weighting coefficient for the malignancy score. The overall loss of the X-Caps method is thereby $$L = L_m + L_a + L_R. \tag{8}$$

Figure 14:
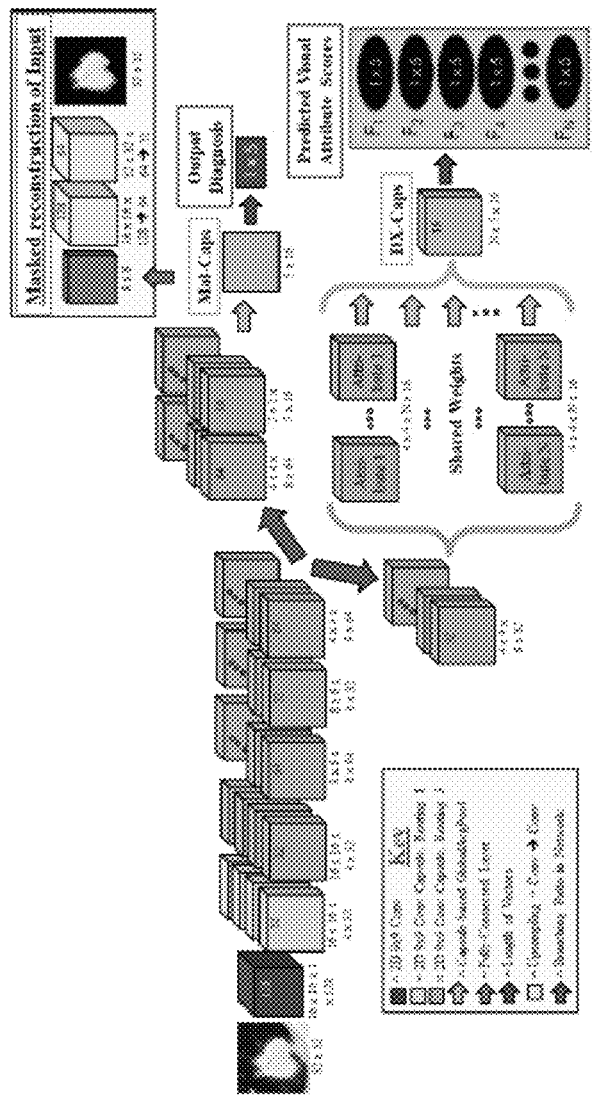
FIG. 14 is an overview of a very deep version of the learning system as applied to lung nodule images, in accordance with an embodiment of the present invention (referred to as DX-Caps).

A very deep network structure is shown in FIG. 14, which is referred to as DX-Caps, or deep explainable capsules. The proposed DX-Caps is a deep capsule-based network which consists of a single convolutional layer, followed by five capsule layers before branching into separate paths for predicting malignancy and visual attributes. The main idea behind this change was to allow for each visual attribute to have their own entire capsule type. This allows the network much more flexibility in its choice of feature selection. For a given attribute, each score has its own vector, and therefore the high-level features being used to identify attribute n score 0 can be different from the features used to identify attribute n score 5.

In order to perform classification, using such a deep network, the more memory-intensive fully-connected capsule was replaced with a capsule-based global average pooling (cGAP) algorithm which splits apart capsules by capsule type in a given layer and reforms new capsules as the average of the vectorized activations from the previous layer. More formally, for a given layer $l_i$, there exists a set of capsule types $C=\{c_1, c_2, \ldots, c_n | \in \mathbb{N}\}$. Within each capsule type, there exists a 2D grid of capsule vectors $V=\{v_{11}, \ldots, v_{1,w}, \ldots v_{h,1}, \ldots, v_{h,w}\}$, where h×w is the spatial dimensions of the capsule type at layer l and each v has dimensions 1×a, where a is the length of the capsule vectors. Parent capsules are formed by computing the average across the spatial grid along each dimension of the capsule vectors, v. Therefore, each child capsule in C has exactly one corresponding parent capsule, where the set of parent capsules is denoted as $P=\{p_1, p_2, \ldots p_m | \in \mathbb{N}\}$. For each p in P, we compute the following $p_i = \Sigma_x^w \Sigma_y^h v_{x,y}$, where each $p_i$ now have dimensions of 1×a. A single overall parent capsule is formed be concatenating each $p_i$ to form a 2D vector of dimension m×a. In the case of the DX-Caps method, m is the number of score classes available—in this case, five. The output is then formed by computing the length of each vector in this 2D grid to arrive at a final m value corresponding to the classification prediction.

Using the method, the output is a classification array, rather than a single value, to attempt to regress the score. This provides a better model for the uncertainty present in the labels provided by the radiologists. Rather than simply trying to regress the average of the values submitted by radiologists, or performing binary classification of these values rounded to above or below as score of 3 as done in nearly all previous works, the distribution of scores is predicted. For a given nodule, three radiologists, at minimum, provide score values for each attribute and for malignancy prediction. The mean and standard deviation of those values is computed and fit to a Gaussian function, which is in turn used as the ground-truth for our classification vector. The method allows the modelling of the uncertainty present in the labels in a way that no previous method has allowed. Nodules with strong radiologist agreement produce a sharp peak and wrong or unsure (i.e. low prediction score) answers are severely punished. However, the same is true for low radiologist agreement nodules.

As noted above, the method was tested on the LIDC-IDRI dataset, which includes 1018 volumetric CT scans with a slice thickness varying from 0.45 mm to 5.0 mm. Each CT scan was interpreted by at most four radiologists by the LIDC-IDRI project team. Lung nodules that have diameters equal to or greater than 3.0 mm were given scores by participating radiologists for each of six visual attributes. Visual scores were ranged from 1 to 5 where 1 denoted benign and 5 meant high malignancy. For simplicity, and including malignancy indecision among radiologists, lung nodules were excluded from the consideration when their mean visual score was 3. Hence, this left 1149 lung nodules to be evaluated (646 benign and 503 malignant). Predictions were considered correct if within 1.0 of the radiologists' average score. Table 6 shows the summary of visual score distribution of lung nodules evaluated by at least three radiologists.

TABLE 6

Individual radiologists' scores

| Attributes | Visual Attribute Scores | | | | |
|---|---|---|---|---|---|
| | 1 | 2 | 3 | 4 | 5 |
| Subtlety | 124 | 274 | 827 | 1160 | 1817 |
| Sphericity | 10 | 322 | 1294 | 1411 | 1165 |
| Margin | 174 | 303 | 512 | 1362 | 1851 |
| Lobulation | 2394 | 924 | 475 | 281 | 128 |
| Spiculation | 2714 | 789 | 336 | 174 | 189 |
| Texture | 207 | 76 | 188 | 485 | 3246 |
| Malignancy | 676 | 872 | 1397 | 658 | 5999 |

Five-fold stratified cross-validation was performed to split the nodules into training and testing sets. Further, 10% of each training set was set aside for validation of the models and early stopping during training. All models were trained using the Adam optimizer method with an initial learning rate of 0:001 while this was dropped by a factor of 10 after validation loss stagnated. All code is implemented in Keras with TensorFlow backend support.

Table 7 demonstrates the prediction of visual attributes with the proposed X-Caps and DX-Caps in comparison with conventional prior art capsule networks. As a result of experiments with 5-fold cross validation settings, we have identified that DXCaps outperformed baseline prior art capsule networks, as well as X-Caps, in predicting individual and overall visual attributes. Experimental results indicate that the global average pooling operation allows creation of deep capsule networks which predict visual attributes better than baseline X-Caps and prior art capsule networks.

TABLE 7

Prediction accuracy of visual attribute learning with capsule networks

| | Network Type | | |
|---|---|---|---|
| Attributes | Prior Art | X-Caps | DX-Caps |
| Subtlety | — | 82.99% | 82.99% |
| Sphericity | — | 76.80% | 97.46% |
| Margin | — | 78.69% | 70.23% |
| Lobulation | — | 25.57% | 70.22% |
| Spiculation | — | 37.81% | 75.35% |
| Texture | — | 89.99% | 89.99% |
| Malignancy Prediction | 78.32% | 69.41% | 80.17% |

It should be noted that the best prediction of visual attributes was obtained when determining sphericity of a nodule. This is not surprising because sphericity is a well-defined visual attribute and has the lowest uncertainty among radiologists' visual scoring compared to other visual attributes which share some similarities with each other and inherent difficulties of finding an appropriate score based on appearance of nodules.

Much of the analysis in deep-learning-assisted medical image diagnosis focuses on improving prediction abilities, rather than explaining decisions made by the methods. The studies that focus on explaining deep-learning models typically focus on visualization of meaningful patterns either at the neuronal level or at the entire network. However, capsule-based networks with interpretable vector representations for anatomical anomalies, such as lung nodules, have not been performed prior to this method. Accordingly, by utilizing the methods discussed herein, image-based disease diagnosis can be performed in a meaningful and accurate way.

REFERENCES

[1] David G Lowe. Object recognition from local scale-invariant features. In Computer vision, 1999. The proceedings of the seventh IEEE international conference on, volume 2, pages 1150-1157. IEEE, 1999.

[2] Navneet Dalal and Bill Triggs. Histograms of oriented gradients for human detection. In Computer Vision and Pattern Recognition, 2005. CVPR 2005. IEEE Computer Society Conference on, volume 1, pages 886-893. IEEE, 2005.

[3] Luminita A Vese and Tony F Chan. A multiphase level set framework for image segmentation using the mumford and shah model. International journal of computer vision, 50(3):271-293, 2002.

[4] Jayaram K Udupa and Supun Samarasekera. Fuzzy connectedness and object definition: theory, algorithms, and applications in image segmentation. Graphical models and image processing, 58(3):246-261, 1996.

[5] Pedro F Felzenszwalb and Daniel P Huttenlocher. Efficient graph-based image segmentation. International journal of computer vision, 59(2):167-181, 2004.

[6] Leo Grady. Random walks for image segmentation. IEEE transactions on pattern analysis and machine intelligence, 28(11):1768-1783, 2006.

[7] Dzung L Pham, Chenyang Xu, and Jerry L Prince. Current methods in medical image segmentation. Annual review of biomedical engineering, 2(1):315-337, 2000.

[8] Jonathan Long, Evan Shelhamer, and Trevor Darrell. Fully convolutional networks for semantic segmentation. In Computer Vision and Pattern Recognition, 2015. CVPR 2015. IEEE Computer Society Conference on, pages 3431-3440, 2015.

[9] Olaf Ronneberger, Philipp Fischer, and Thomas Brox. U-net: Convolutional networks for biomedical image segmentation. In International Conference on Medical image computing and computer-assisted intervention, pages 234-241. Springer, 2015.

[10] Aliasghar Mortazi, Jeremy Burt, and Ulas Bagci. Multiplanar deep segmentation networks for cardiac substructures from mri and ct. stat, 1050:3, 2017.

[11] Simon Jégou, Michal Drozdzal, David Vazquez, Adriana Romero, and Yoshua Bengio. The one hundred layers tiramisu: Fully convolutional densenets for semantic segmentation. In IEEE Conference on Computer Vision and Pattern Recognition Workshops (CVPRW), 2017 IEEE Conference on, pages 1175-1183. IEEE, 2017.

[12] Gao Huang, Zhuang Liu, Kilian Q Weinberger, and Laurens van der Maaten. Densely connected convolutional networks. In Computer Vision and Pattern Recognition, 2005. CVPR 2005. IEEE Computer Society Conference on, 2017.

[13] Aliasghar Mortazi, Rashed Karim, Kawal Rhode, Jeremy Burt, and Ulas Bagci. Cardiacnet: Segmentation of left atrium and proximal pulmonary veins from mri using multi-view cnn. In International Conference on Medical Image Computing and Computer-Assisted Intervention, pages 377-385. Springer, 2017.

[14] Vijay Badrinarayanan, Alex Kendall, and Roberto Cipolla. Segnet: A deep convolutional encoder-decoder architecture for image segmentation. IEEE transactions on pattern analysis and machine intelligence, 39(12):2481-2495, 2017.

[15] Guosheng Lin, Anton Milan, Chunhua Shen, and Ian Reid. Refinenet: Multi-path refinement networks for high-resolution semantic segmentation. In Computer Vision and Pattern Recognition, 2017. CVPR 2017. IEEE Computer Society Conference on, 2017.

[16] Hengshuang Zhao, Jianping Shi, Xiaojuan Qi, Xiaogang Wang, and Jiaya Jia. Pyramid scene parsing network. In Computer Vision and Pattern Recognition, 2017. CVPR 2017. IEEE Computer Society Conference on, pages 2881-2890, 2017.

[17] Chao Peng, Xiangyu Zhang, Gang Yu, Guiming Luo, and Jian Sun. Large kernel matters-improve semantic segmentation by global convolutional network. In Computer Vision and Pattern Recognition, 2017. CVPR 2017. IEEE Computer Society Conference on, pages 4353-4361, 2017.

[18] Rodney LaLonde, Dong Zhang, and Mubarak Shah. Clusternet: Detecting small objects in large scenes by exploiting spatio-temporal information. In Computer Vision and Pattern Recognition, 2018. CVPR 2018. IEEE Computer Society Conference on, 2018.

[19] Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. IEEE transactions on pattern analysis and machine intelligence, 40(4):834-848, 2018.

[20] Awais Mansoor, Ulas Bagci, Ziyue Xu, Brent Foster, Kenneth N Olivier, Jason M Elinoff, Anthony F Suffredini, Jayaram K Udupa, and Daniel J Mollura. A generic approach to pathological lung segmentation. IEEE transactions on medical imaging, 33(12):2293-2310, 2014.

[21] Sara Sabour, Nicholas Frosst, and Geoffrey E Hinton. Dynamic routing between capsules. In Advances in Neural Information Processing Systems, pages 3859-3869, 2017.

[22] Eva M van Rikxoort, Bartjan de Hoop, Max A Viergever, Mathias Prokop, and Bram van Ginneken. Automatic lung segmentation from thoracic computed tomography scans using a hybrid approach with error detection. Medical physics, 36(7):2934-2947, 2009.

[23] Diederik P Kingma and Jimmy Ba. Adam: A method for stochastic optimization. arXiv preprint arXiv:1412.6980, 2014.

[24] Kuiper, T.; Marsman, W.; Jansen, J.; J van Soest, E.; Haan, Y.; Bakker, G.; Fockens, P.; and Dekker, E. 2012. Accuracy for optical diagnosis of small colorectal polyps in nonacademic settings. 10:1016-20; quiz e79.

[25] Ladabaum, U.; Fioritto, A.; Mitani, A.; Desai, M.; Kim, J. P.; Rex, D. K.; Imperiale, T.; and Gunaratnam, N. 2013. Real-time optical biopsy of colon polyps with narrow band imaging in community practice does not yet meet key thresholds for clinical decisions. Gastroenterology. 144(1):81-91.

[26] Rees, C. J.; Rajasekhar, P. T.; Wilson, A.; Close, H.; Rutter, M. D.; Saunders, B. P.; East, J. E.; Maier, R.; Moorghen, M.; Muhammad, U.; Hancock, H.; Jayaprakash, A.; MacDonald, C.; Ramadas, A.; Dhar, A.; and Mason, J. M. 2017. Narrow band imaging optical diagnosis of small colorectal polyps in routine clinical practice: the detect inspect characterize resect and discard 2 (discard 2) study. Gut 66(5):887-895.

[27] Wallace, M. B.; Crook, J. E.; Coe, S.; Ussui, V.; Staggs, E.; Almansa, C.; Patel, M. K.; Bouras, E.; Cangemi, J.; Keaveny, A.; Picco, M.; and Riegert-Johnson, D. 2014. Accuracy of in vivo colorectal polyp discrimination by

[27] ...using dual-focus high-definition narrow-band imaging colonoscopy. Gastrointestinal Endoscopy 80(6): 1072-1087.

[28] Mesejo, P.; Pizarro, D.; Abergel, A.; Rouquette, O.; Beorchia, S.; Poincloux, L.; and Bartoli, A. 2016. Computer-aided classification of gastrointestinal lesions in regular colonoscopy. IEEE Transactions on Medical Imaging 35(9):2051-2063.

[29] Zhang, R.; Zheng, Y.; Mak, T. W. C.; Yu, R.; Wong, S. H.; Lau, J. Y. W.; and Poon, C. C. Y. 2017. Automatic detection and classification of colorectal polyps by transferring low-level cnn features from nonmedical domain. IEEE Journal of Biomedical and Health Informatics 21(1):41-47.

[30] Byrne, M. F.; Chapados, N.; Soudan, F.; Oertel, C.; Linares Perez, M.; Kelly, R.; Iqbal, N.; Chandelier, F.; and Rex, D. K. 2017. Real-time differentiation of adenomatous and hyperplastic diminutive colorectal polyps during analysis of unaltered videos of standard colonoscopy using a deep learning model. Gut.

[31] Chen, P.-J.; Lin, M.-C.; Lai, M.-J.; Lin, J.-C.; Lu, H. H.-S.; and Tseng, V. S. 2018. Accurate classification of diminutive colorectal polyps using computer-aided analysis. Gastroenterology 154(3):568-575.

[32] N. L. S. T. R. Team. Reduced lung-cancer mortality with low-dose computed tomographic screening. New England Journal of Medicine, 365(5):395-409, 2011.

[33] D. F. Yankelevitz and J. P. Smith. Understanding the core result of the national lung screening trial. New England Journal of Medicine, 368(15): 1460-1461, 2013.

[34] N. Howlader et al. SEER Cancer Statistics Review, 1975-2013, National Cancer Institute. https://seer.cancer.gov/archive/csr/1975_2013/04.2018.

[35] H. M. Marshall, R. V. Bowman, I. A. Yang, K. M. Fong, and C. D. Berg. Screening for lung cancer with low-dose computed tomography: a review of current status. Journal of thoracic disease, 5(Suppl 5):S524, 2013.

[36] H. C. Shin, H. R. Roth, M. Gao, L. Lu, Z. Xu, I. Nogues, J. Yao, D. Mollura, and R. M. Summers. Deep convolutional neural networks for computer-aided detection: Cnn architectures, dataset characteristics and transfer learning. IEEE transactions on medical imaging, 35(5):1285-1298, 2016.

[37] A. A. A. Setio, A. Traverso, T. De Bel, M. S. Berens, C. van den Bogaard, P. Cerello, H. Chen, Q. Dou, M. E. Fantacci, B. Geurts, et al. Validation, comparison, and combination of algorithms for automatic detection of pulmonary nodules in computed tomography images: the luna16 challenge. Medical image analysis, 42:1-13, 2017.

[38] M. Buty, Z. Xu, M. Gao, U. Bagci, A. Wu, and D. J. Mollura. Characterization of lung nodule malignancy using hybrid shape and appearance features. In International Conference on Medical Image Computing and Computer-Assisted Intervention, pages 662-670. Springer, 2016.

[39] S. Hussein, R. Gillies, K. Cao, Q. Song, and U. Bagci. Tumornet: Lung nodule characterization using multi-view convolutional neural network with gaussian process. In Biomedical Imaging (ISBI 2017), 2017 IEEE 14th International Symposium on, pages 1007-1010. IEEE, 2017.

[40] S. Hussein, K. Cao, Q. Song, and U. Bagci. Risk stratification of lung nodules using 3d cnn-based multi-task learning. In International Conference on Information Processing in Medical Imaging, pages 249-260. Springer, 2017.

[41] N. Khosravan and U. Bagci. S4nd: Single-shot single-scale lung nodule detection. MICCAI, 2018.

[42] N. Khosravan, H. Celik, B. Turkbey, E. Jones, B. Wood, and U. Bagci. A collaborative computer aided diagnosis (c-cad) system with eye-tracking, sparse attentional model, and deep learning. Medical Image Analysis, 2019.

[43] A. A. A. Setio et al. Pulmonary nodule detection in ct images: false positive reduction using multi-view convolutional networks. IEEE transactions on medical imaging, 35(5):1160-1169, 2016.

[44] X. Huang, J. Shan, and V. Vaidya. Lung nodule detection in ct using 3d convolutional neural networks. In Biomedical Imaging (ISBI 2017), 2017 IEEE 14th International Symposium on, pages 379-383. IEEE, 2017.

[45] J. Ding, A. Li, Z. Hu, and L. Wang. Accurate pulmonary nodule detection in computed tomography images using deep convolutional neural networks. In International Conference on Medical Image Computing and Computer-Assisted Intervention, pages 559-567. Springer, 2017.

[46] Q. Dou, H. Chen, L. Yu, J. Qin, and P.-A. Heng. Multilevel contextual 3-d cnns for false positive reduction in pulmonary nodule detection. IEEE Transactions on Biomedical Engineering, 64(7):1558-1567, 2017.

[47] S. Armato III, G. McLennan, L. Bidaut, M. F. McNitt-Gray, C. R. Meyer, A. P. Reeves, B. Zhao, D. R. Aberle, C. I. Henschke, E. A. Hoffman, et al. The Lung Image Database Consortium (LIDC) and Image Database Resource Initiative (IDRI): a completed reference database of lung nodules on CT scans. Medical Physics, 38(2):915-931, 2011.

[48] Krizhevsky, I. Sutskever, and G. E. Hinton. Imagenet classification with deep convolutional neural networks. In Advances in neural information processing systems, pages 1097-1105, 2012.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

What is claimed is:

1. A method of segmenting an object, comprising the steps of:
   receiving an input image at a computing device;
   passing the input image through a convolutional layer, thereby producing a plurality of feature maps of spatial dimensions for the input image, the plurality of feature maps forming a set of children capsules, the set of children capsules having an associated set of parameters;
   creating a set of prediction vectors based on the set of children capsules and the set of parameters;
   using the set of prediction vectors to determine a set of parent capsules, each parent capsule including one or more kernels, the set of parent capsules selected after comparing an agreement between prediction vectors for a given parent capsule, such that the set of prediction vectors are locally-constrained within each of the parent capsules' kernels;
   sharing the set of parameters within the set of children capsules, thereby reducing memory and parameter burden on the computing device; and
   reconstructing the input image via a masked segmentation process, during which the prediction vectors associated with the input image are mapped, and all other pixels are treated as background.

2. The method of claim 1, wherein the input image is a 512×512 pixel image.

3. The method of claim 1, wherein each of the prediction vectors is a sixteen-dimensional vector.

4. The method of claim 1, wherein each of the one or more kernels of one of the set of parent capsules includes a portion of the set of children capsules.

5. The method of claim 4, wherein the set of parameters shared with the set of children capsules is restricted to the portion of the set of the children capsules within a user-selected kernel.

6. The method of claim 1, wherein during the step of passing the image through the convolutional layer, the method further comprises extracting low-level feature information from the image.

7. The method of claim 1, wherein after the step of passing the image through the convolutional layer an output image is produced, further comprising a step of reshaping the output image before forming the set of children capsules.

8. The method of claim 1, further comprising a plurality of sets of children capsules, each of the plurality of sets of children capsules having a different associated set of parameters, such that each of the plurality of sets of children capsules represents a different attribute of the input image.

9. The method of claim 8, further comprising a step of separating each of the sets of children capsules from each other by performing a capsule-based global average pooling by capsule type.

10. The method of claim 9, further comprising a step of reforming new capsules within at least one of the sets of children capsules after performing the capsule-based global average pooling, the new capsules based on an average of the set of prediction vectors within the at least one of the sets of children capsules.

11. The method of claim 1, further comprising a step of determining an accuracy of the reconstructed input image by receiving a user-defined attribute and comparing the reconstructed input image to the user-defined attribute.

12. The method of claim 1, further comprising a step of receiving a plurality of input images and performing the steps of the method for each of the plurality of input images.

13. The method of claim 1, further comprising a step of analyzing the reconstructed input image to determine a visual anomaly on the reconstructed image, the visual anomaly indicative of a malignant cancer diagnosis.

14. A method of screening an image for a visual anomaly, the method comprising the steps of:
   receiving an input image at a computing device, the input image being a representation of an anatomical region of a patient;
   passing the input image through a convolutional layer, thereby producing a plurality of feature maps of spatial dimensions for the input image, the plurality of feature maps forming a set of children capsules, the set of children capsules having an associated set of parameters;
   creating a set of prediction vectors based on the set of children capsules and the set of parameters, at least one of the set of prediction vectors configured to map a visual anomaly within the input image;
   using the set of prediction vectors to determine a set of parent capsules, each parent capsule including one or more kernels, the set of parent capsules selected after comparing an agreement between prediction vectors for a given parent capsule, such that the set of prediction vectors are locally-constrained within each of the parent capsules' kernels;
   sharing the set of parameters within the set of children capsules, thereby reducing memory and parameter burden on the computing device;
   reconstructing the input image via a masked segmentation process, during which the prediction vectors associated with the input image are mapped, and all other pixels are treated as background; and
   analyzing the reconstructed input image to determine a presence of a visual anomaly on the reconstructed image, the visual anomaly indicative of a malignant cancer diagnosis.

15. The method of claim 14, wherein after the step of passing the image through the convolutional layer an output image is produced, further comprising a step of reshaping the output image before forming the set of children capsules.

16. The method of claim 14, further comprising a plurality of sets of children capsules, each of the plurality of sets of children capsules having a different associated set of parameters, such that each of the plurality of sets of children capsules represents a different attribute of the input image.

17. The method of claim 16, further comprising a step of separating each of the sets of children capsules from each other by performing a capsule-based global average pooling by capsule type.

18. The method of claim 17, further comprising a step of reforming new capsules within at least one of the sets of children capsules after performing the capsule-based global average pooling, the new capsules based on an average of the set of prediction vectors within the at least one of the sets of children capsules.

19. The method of claim 14, further comprising a step of determining an accuracy of the determination of the presence of the visual anomaly by receiving a user-defined determination of the visual anomaly and comparing the determined presence of the visual anomaly with the user-defined determination of the visual anomaly.

* * * * *

UNITED STATES PATENT AND TRADEMARK OFFICE
CERTIFICATE OF CORRECTION

PATENT NO. : 11,010,902 B2
APPLICATION NO. : 16/431387
DATED : May 18, 2021
INVENTOR(S) : Ulas Bagci and Rodney LaLonde Page 1 of 1

It is certified that error appears in the above-identified patent and that said Letters Patent is hereby corrected as shown below:

In the Claims

Column 21, Claim 1, Line 11 should read:
creating a set of prediction vectors on a pixel-by-pixel level based on the set of Column 22, Claim 14, Line 18 should read:
creating a set of prediction vectors on a pixel-by-pixel level based on the set of Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*